Nov. 7, 1961  L. PARKIN  3,007,726
FASTENING DEVICES
Filed Dec. 3, 1959

INVENTOR
LESLIE PARKIN,
BY Walter S. Jones
ATTORNEY 3,007,726
FASTENING DEVICES
Leslie Parkin, Bobbers Hill, England, assignor to United-Carr Fastener Corporation, Wilmington, Del., a corporation of Delaware
Filed Dec. 3, 1959, Ser. No. 856,985
2 Claims. (Cl. 287—53)

This invention relates to fastening devices for securing a stud, rod or the like in a cavity in a support.

According to the present invention, an assembly comprises a stud, rod or the like secured in a cavity in a support by a fastening device formed from resilient sheet metal and comprising a base with an aperture, a first series of integral resilient tongues extending inwardly of the aperture and outwardly of the plane of the base into engagement with the stud, rod or the like and a second series of resilient tongues extending from the periphery of the base and outwardly of the plane of the base on the opposite side of the said plane to the first series of resilient tongues into engagement with the internal wall of the cavity.

The tongues of one or both series may be equally spaced around the base, and the tongues of one series may be staggered with respect to the tongues of the other series. The slits between the resilient tongues of either series may extend into the base.

Figure 1:
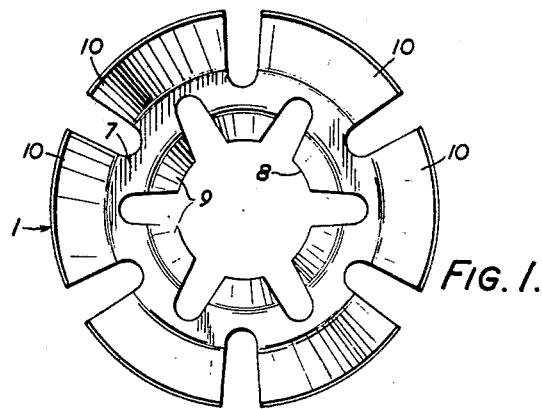
Figure 2:
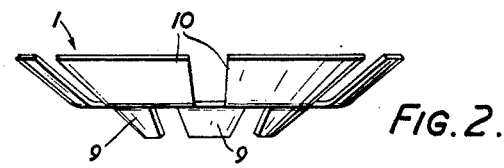
Figure 3:
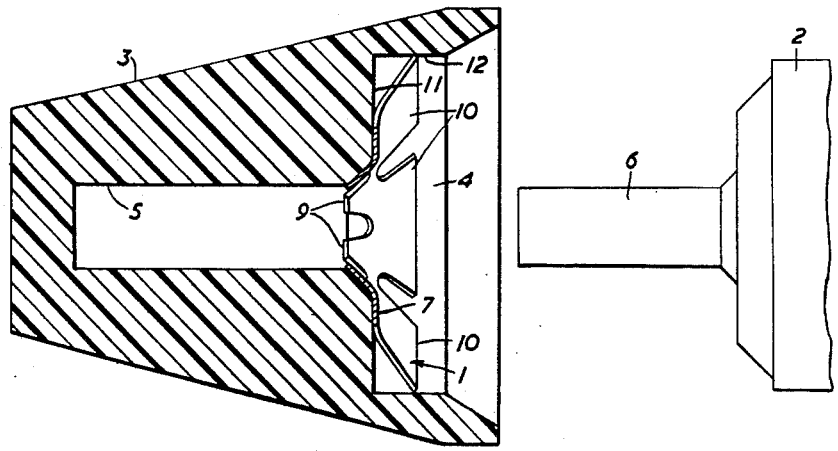

One embodiment of the present invention will now be described with reference to the accompanying drawing, of which:

FIG. 1 is a plan view of a fastening device,
FIG. 2 is a side elevation of the fastening device, and
FIG. 3 is a sectional view, partly in elevation, of a stud positioned for assembly into a cavity in which the fastening device is secured.

As shown in the accompanying drawing, a fastening device 1 is used to secure the end of a rod like member shown herein as an umbrella stick 2 to a support shown herein as a ferrule 3. The ferrule 3 is of nylon and has a frusto-conical shape with a cavity 4 of circular cross-section open at the end of the ferrule which is of larger diameter. The ferrule 3 is formed with an axial bore 5 to receive the end 6 of the stick 2. The bore 5 opens at one end into the fastener receiving cavity 4. The umbrella stick 2 has a diameter slightly less than the diameter of the cavity 4 and an end portion 6 is of a reduced diameter which is slightly less than that of the bore 5.

The fastening device 1 is formed from resilient sheet metal and comprises a circular base 7 with a central aperture 8, a first series of integral tongues 9 extending into and spaced equally around the aperture 8 and outwardly of the plane of the base 7 and a second series of integral tongues 10 spaced equally around the periphery of the base 7 and extending outwardly of the plane of the base on the opposite side of the plane to the first series 9. The tongues 9 are staggered with respect to the tongues 10 and the slits between the tongues 9 and 10 extend into the base 7 to give increased resiliency.

The fastening device 1 is forced into the cavity 4 in the ferrule 3 so that the base 7 abuts the bottom 11 of the cavity, the tongues 9 extend inwardly of the bore 5 and the tongues 10 are in engagement with the internal wall 12 of the cavity. The tongues 10 bite into the internal wall 12 of the cavity and prevent withdrawal of the fastening device 1 from the cavity 4.

The end 6 of the umbrella stick 2 is then forced into the cavity 4 so that it enters into the bore 5 and the tongues 9 bite into the outer wall of the end 6 and prevent withdrawal of the stick 2 from the ferrule. The end of the umbrella stick 2 is so made that when assembled with the ferrule 3 substantially the whole of the cavity 4 is taken up by the end of the umbrella stick.

The invention is not limited to securing the end of a rod, stud or the like in a cavity with a closed or partially closed end, but may be used where the cavity is open at both ends such that the rod, stud or the like may be secured at any point along its length. Further, the fastening device may be adapted for use wherein the cavity or the rod, stud or the like have a cross-section other than circular. In the latter case the resilient fingers will be so arranged as to define an aperture corresponding to the cross-section of the rod, stud or the like.

I claim:

1. An assembly comprising a stud, rod or the like secured in a cavity in a support by a fastening device formed from resilient sheet metal and comprising a base with an aperture, a first series of integral resilient tongues extending inwardly of the aperture and outward of the plane of the base into engagement with the stud, rod or the like, said first series of tongues being separated by slots terminating in said base, and a second series of resilient tongues extending from the periphery of the base and outwardly of the plane of the base on the opposite side of the said plane to the first series of resilient tongues into engagement with a wall surrounding the cavity in the support, said second series of tongues being separated by slots terminating in said base at points on a circle extending through said first slots.

2. An assembly according to claim 1 wherein the tongues of one series are staggered with respect to the tongues of the other series.

References Cited in the file of this patent
UNITED STATES PATENTS 2,503,854    Trainor _____ Apr. 11, 1950
2,621,947    Markvart _____ Dec. 16, 1952